(12) United States Patent
Nivet

(10) Patent No.: US 6,731,088 B2
(45) Date of Patent: May 4, 2004

(54) VEHICLE SEAT

(75) Inventor: Laurent Nivet, Asnieres (FR)

(73) Assignee: LABINAL Montigny-le-Bretonneux (FR)

( * ) Notice: Subject to any disclaimer, the term of this patent is extended or adjusted under 35 U.S.C. 154(b) by 0 days.

(21) Appl. No.: 10/005,916

(22) Filed: Dec. 7, 2001

(65) Prior Publication Data

US 2002/0070591 A1 Jun. 13, 2002

(30) Foreign Application Priority Data

Dec. 8, 2000 (FR) .............................. 00 16020

(51) Int. Cl.[7] .................................. H02P 7/56
(52) U.S. Cl. ................... 318/548; 318/552; 318/265; 318/266; 318/286; 297/61; 297/68; 297/311; 297/313; 297/330
(58) Field of Search ............................. 318/548, 552, 318/265, 266, 286; 297/61, 68–70, 311, 313, 330, 391

(56) References Cited

U.S. PATENT DOCUMENTS

| 4,456,861 | A | * | 6/1984 | Ratzel et al. ............... 318/568 |
| 4,706,194 | A | * | 11/1987 | Webb et al. ................. 364/424 |
| 4,809,180 | A | * | 2/1989 | Saitoh ..................... 364/424.05 |
| 5,006,771 | A | * | 4/1991 | Ogasawara ............. 318/568.1 |
| 5,254,924 | A | | 10/1993 | Ogasawara |
| 5,670,853 | A | * | 9/1997 | Bauer ........................ 318/286 |
| 5,754,780 | A | | 5/1998 | Asakawa et al. |
| 5,894,207 | A | * | 4/1999 | Goings ....................... 318/280 |
| 6,194,853 | B1 | | 2/2001 | Tual et al. |
| 6,339,302 | B1 | * | 1/2002 | Greenbank et al. ......... 318/103 |
| 6,441,576 | B1 | * | 8/2002 | Marin-Martinod et al. ...................... 318/568.1 |
| 6,538,405 | B1 | * | 3/2003 | Brzozowski et al. ........ 318/280 |

FOREIGN PATENT DOCUMENTS

| EP | 1 010 570 A2 | 6/2000 |
| FR | 2 730 080 | 8/1996 |
| FR | 2 781 293 | 1/2000 |

* cited by examiner

Primary Examiner—Rina Duda
(74) Attorney, Agent, or Firm—Stites & Harbison PLLC; Ross F. Hunt, Jr.

(57) ABSTRACT

The vehicle seat (10) comprises at least one electrically powered functional member (24, 26, 28, 30, 31, 32, 34, 38). This functional member comprises an active element (24E, 26E, 28E, 30E, 31E, 32E, 34E) designed to perform a unique elemental function; a local control unit (24D, 26D, 28D, 30D, 31D, 32D, 34D) for controlling an active element (24E, 26E, 28E, 30E, 31E, 32E, 34E); units (24B, 26B, 28B, 30B, 31B, 32B, 34B) of receiving commands; and units (24F, 26F, 28F, 30F, 31F, 32F, 34F, 38F) for collecting operational status data from the functional member (24, 26, 28, 30, 31, 32, 34). The seat comprises a communication bus (42) to which each of the receiving units (24B, 26B, 28B, 30B, 31B, 32B, 34B). At least one functional member comprises operational status data transmission units (24C, 26C, 28C, 30C, 31C, 32C, 34C) which transmission units (24C, 26C, 28C, 30C, 31C, 32C, 34C) are incorporated into the functional member (24, 26, 28, 30, 31, 32, 34) and are each directly connected to the communication bus (42) for transmitting operational status data on the communication bus (42).

8 Claims, 3 Drawing Sheets

VEHICLE SEAT

The present invention relates to a vehicle seat of the type comprising:
- at least one electrically powered functional member which functional member comprises:
  - an active element designed to perform a unique elemental function;
  - a local control unit for controlling an active element of the functional member from commands;
  - means of receiving commands, which receiving means are incorporated into the said functional member; and
  - means for collecting operational status data from the functional member; and
- a communication bus to which each of the receiving means of the or of each functional member is directly connected for transmitting commands.

It relates in particular to vehicle seats which can be used for example in passenger aircraft.

These seats generally comprise a seat cushion, to one end of which an inclinable back-rest is articulated. Articulated to the other end of the seat cushion is a leg-rest, extended by a foot-rest, both of which latter rests can move.

The seat is equipped with electric actuators so as to move the various elements thereof with respect to one another.

In the state of the art, in order to control the dynamics of the seat, a central control unit is provided on each seat and this central unit powers each of the actuators of the seat so as to move them in a determined direction, at a given speed and for a given time.

Furthermore, in order to determine the position of each element of the seat, each actuator is equipped with a transducer such as a potentiometer supplying data representative of its operational status.

This transducer is connected to the central control unit so that the status data collected can be exploited.

The presence of the supply wires and the communication wires for transmitting status data leads to there being a very large number of wires in the seat.

In practice, these wires are gathered together to form looms which are relatively bulky and difficult to conceal within the seat.

In order to reduce the number of supply wires, it is known practice, for example from document EP-A-1.010.570, to provide a bus for transmitting commands to each of the actuators, the commands being transmitted by a control unit connected to the bus. To supply electrical power, each actuator is powered directly from an electrical power supply line.

The proposed solution admittedly makes it possible to reduce the number of supply wires, but does not make it possible to perform complex dynamics of moving the various elements of the seat, particularly synchronizing the movements of these elements.

Elsewhere, document U.S. Pat. No. 4,706,194 describes a multiplex control system for a seat in which a two-way bus is used. A central control unit is provided on this bus for controlling the actuators of the seat.

A multiplexing unit is connected to the bus and each of the actuators is connected to the multiplexing unit, on the one hand, for controlling it and, on the other hand, so that the actuator can transmit operational status data.

Thus, for each actuator, the multiplexing unit has inputs and outputs specific to the actuator and to which the actuator is connected.

This being the case, there are numerous connecting wires between the multiplexing unit and each actuator. There are therefore still wiring looms inside the seat, ever though they do not directly connect the central control unit to each of the actuators.

Hence, in the arrangement described in that document, there is a relatively dense wiring loom between the multiplexing unit and each of the actuators, thus removing the benefit to using a bus.

It is an object of the invention to propose a vehicle seat comprising a set of functional members that can be controlled individually or with synchronization between the operation of the various functional members, and which does not require the use of bulky wiring.

To this end, the subject of the invention is a vehicle seat of the aforementioned type, characterized in that at least one functional member comprises operational status data transmission means which transmission means are incorporated into the said functional member and are each directly connected to the communication bus for transmitting operational status data on the communication bus.

According to some particular embodiments, the seat has one or more of the following characteristics:
- it comprises a central data processing unit which central data processing unit comprises, on the one hand, means of transmitting commands which means are connected to the communication bus for transmitting at least one command to at least one functional member and, on the other hand, means of receiving operational status data, which means are connected to the communication bus for receiving operational status data transmitted by the or each functional member;
- the said central data processing unit comprises means of analysing the operational status data received and means of formulating commands for at least one functional member;
- the said analysis means are designed to analyse jointly operational status data from at least two functional members;
- the or each functional member is one of the members chosen from the group consisting of: an actuator, a heating member, a massage device, an inflatable cushion, a lighting device, a keypad and an item of audiovisual equipment;
- the communication bus is a bus of the serial type; and
- it comprises at least one functional member which has no active element designed to exert an elemental function, the or each functional member comprising means of collecting operational status data from the functional member.

The invention will be better understood from reading the description which will follow, which is given solely by way of example and made with reference to the drawings in which.

Figure 1:
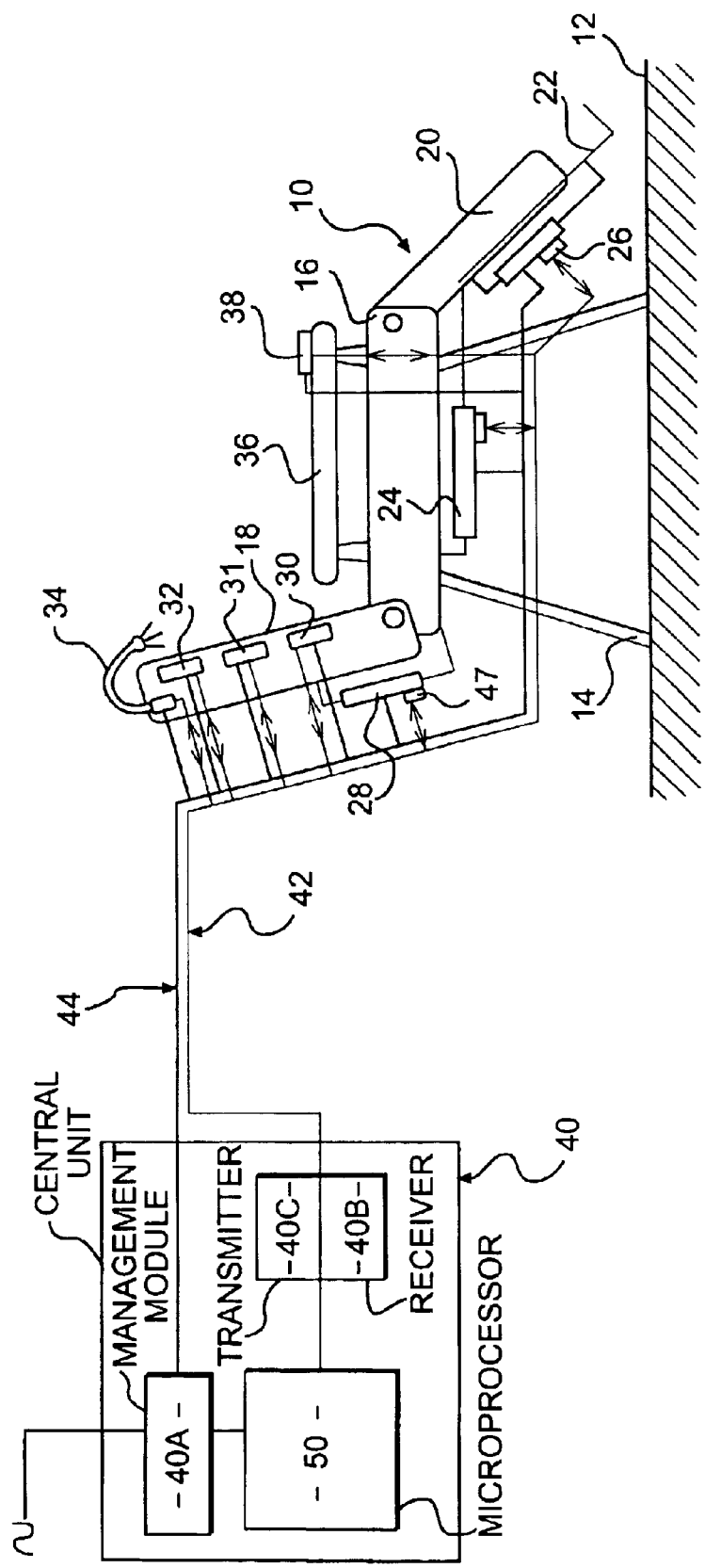
FIG. 1 is a schematic view of a vehicle seat according to the invention.

The seat 10 depicted in FIG. 1 is an aircraft passenger seat. This seat is fixed to the floor 12 of the aircraft.

The seat 10 has an underframe 14 secured to the floor 12 and on which a roughly horizontal seat cushion 16 rests.

Articulated to one end of the seat cushion is a back-rest 18 which can be moved between a roughly vertical raised position and a roughly horizontal folded position.

Articulated to the other end of the seat cushion 16 is a leg-rest 20 that can be moved between a roughly vertical position folded under the seat cushion 16 and a roughly horizontal position extended in the continuation of the seat cushion 16. The leg-rest is carried by the seat cushion 16.

The seat 10 also comprises a foot-rest 22 mounted so that it can move in sliding with respect to the leg-rest 20 in the continuation thereof.

The foot-rest 22 can move between a position retracted up inside the leg-rest 20 and an extended position in which it extends the latter and is almost completely deployed.

A first electric actuator 24 is mounted between the seat cushion 16 and the leg-rest 20 so as to move the latter between its folded position and its extended position.

Likewise, a second actuator 26 is provided between the leg-rest 20 and the foot-rest 22 so as to move the foot-rest between its retracted position and its extended position.

A third actuator 28 is mounted between the seat cushion 16 and the back-rest 18 so as to move the back-rest between its raised position and its folded position.

The back-rest 18 comprises, in its lower region, a lumbar massage device 30 incorporated into the thickness of the back-rest. This lumbar massage device comprises, for example, rotary elements capable of exerting periodic pressure at the base of the passenger's back.

Furthermore, the back-rest 18 comprises, in its middle part, a heating device 31 incorporating, for example, electrical resistors capable of furnishing the passenger with heat.

Incorporated into the upper region of the back-rest 18 is an inflatable head-rest 32. This comprises a number of inflatable cushions, inflation or deflation of which varies the shape of the head-rest so as to tailor the configuration of the top of the back-rest to the way in which the passenger's head is resting.

Finally, a lighting device 34 is installed at the top of the back-rest 18.

Audiovisual equipment is also advantageously installed on the seat.

The seat further comprises an arm-rest 36, to which a control keypad 38 is fixed, for controlling the actuators 24, 26, 28 and for controlling the devices 30, 31, 32 and 34.

The actuators 24, 26 and 28, the devices 30, 31, 32 and 34, and the keypad 38 form functional members which are controlled by a central data processing unit 40 incorporated into the seat. This central unit is designed also to gather information from each of the functional members incorporated into the seat.

Each of the functional members is able to perform a unique elemental function. They are connected in series to the central data processing unit by a communication bus 42 allowing the two-way transmission of data between the functional members and the central data processing unit.

This communication bus is, for example, of the RS 485 type.

Furthermore, each of the functional members, and the central data processing unit 40 are connected, in order to supply them with electrical power, to one and the same electrical power supply network 44 consisting of two conductors to which the functional members and the central unit 40 are connected in parallel.

Advantageously, the communication bus 42 and the supply network 44 are arranged in one and the same wiring loom.

Figure 2:
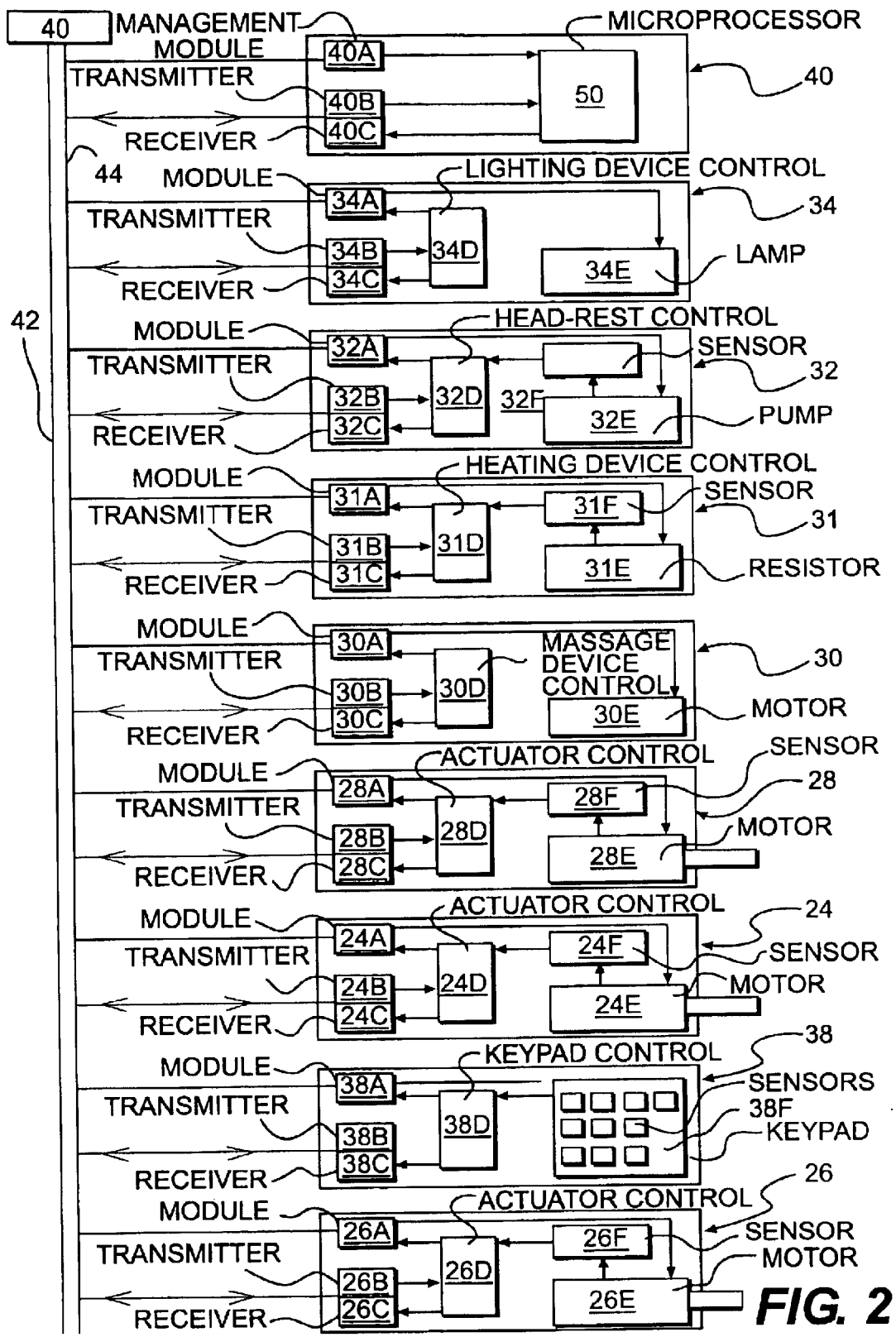
FIG. 2 is a more detailed schematic view of the control network for the functional members of a seat according to the invention.

The structure of the network formed by the bus 42 to which the central data processing unit 40 of the various functional members incorporated into the seat are connected is depicted schematically more clearly in FIG. 2. The supply of electrical power to the element of the seat by the network 44 is also depicted therein.

In that figure, each functional member 24, 26, 28, 30, 31, 32, 34 and 38 is illustrated schematically as is the central data processing unit 40.

Each functional member and the central data processing unit comprise their own power supply and management module denoted by the same reference as the reference denoting the functional member and the central unit, following the letter "A".

This supply module incorporated into each functional member and into the central unit 40 is connected to the electrical distribution network 44.

Likewise, each functional member of the seat and the central data processing unit 40 comprise a communication interface connected to the communication bus 42.

Each communication interface comprises means of receiving data transmitted on the communication bus. These receiving means are denoted in the functional member by the same general reference as the functional member comprising them, followed by the letter "B".

In the case of the functional members, these receiving means are designed in particular to receive commands or status requests transmitted on the network and issued by the central data processing unit 40.

In the case of the central data processing unit 40, the receiving means denoted 40B are designed in particular to receive operational status greater from one or more of the functional members connected to the bus 42.

Furthermore, each communication interface comprises means of transmitting data or the communication bus 42. This transmission means are denoted in the functional members by the same general reference as the functional member comprising them, followed by the letter "C".

The transmission means incorporated into the functional members are in particular designed to transmit on the network operational status data specific to the functional member in question.

The transmission means denoted 40C of the central data processing unit are designed in particular for transmitting on the network status commands or requests sent to one or more of the functional members connected to the communication bus 42.

Each functional member 24, 26, 28, 30, 31, 32, 34, 38 comprises a local control unit for controlling the active elements of the functional member and/or for controlling sensors provided on the functional members.

In each functional member, the local control unit is denoted by the same reference number as the functional member comprising it, followed by the letter "D".

The active element of the functional member consists for example of an electrical motor, in the case of the actuators 24, 26, 28 and in the case of the massage member 30, of electrical resistor in the heating device 31, of a pump in the inflatable head-rest 32, and of a lamp in the lighting device 34.

Each of the active elements is denoted by the same reference number as the functional member into which it is incorporated, followed by the letter "E".

Certain functional members comprise at least one sensor allowing data about the functional status of the associated functional member to be gathered. This or these sensor(s) is or are denoted by the same reference number as the functional member into which it or they are incorporated, followed by the letter "F".

In the actuators 24, 26 and 28, this sensor is, for example, an actuator-position sensor, such as a potentiometer.

The massage device 30 has, for example, no sensors, whereas the heating device 31 is equipped with a temperature sensor 31F.

The head-rest 32 is equipped with a pressure sensor 32F for each of the inflatable cushions, and the lighting device 34 has no sensor.

In the keypad 38, each key constitutes a sensor 38F.

In each functional member, the sensors present are connected to the local control unit, which is also connected to the active element of the functional member in order to control it, if such a member is present.

Furthermore, the local control unit is connected to the communication interface of the functional member incorporating it, that is to say to the data receiving and data transmitting means.

In the case of each functional member, the local control unit is designed to control the active element of the functional member from commands received from the bus 42 via the data receiving means.

In addition the local control unit is designed to collect operational status data from the associated functional member, this data being collected by the sensors incorporated therein. The local control unit is designed to send the operational status data thus collected to the central data processing unit 40 through the data transmitting means incorporated into the functional member and to do this in particular when an operational status request sent by the central data processing unit 40 is received.

The central data processing unit 40 comprises means of analysing the functional state of data received through the receiving means 40B and means formulating commands and/or status requests intended to be transmitted to at least one functional member through the transmission means 40C.

These means for analysing and formulating commands and/or status requests are formed for example of a microprocessor 50 associated with an operating environment.

The operational status data received is analysed and the commands and/or status requests are formulated from algorithms implemented by the microprocessor 50.

It will be appreciated that, in a vehicle seat equipped with a network such as the one described with reference to FIG. 2, data may be exchanged in two directions between the central data processing unit 40 and the functional members.

Figure 3:
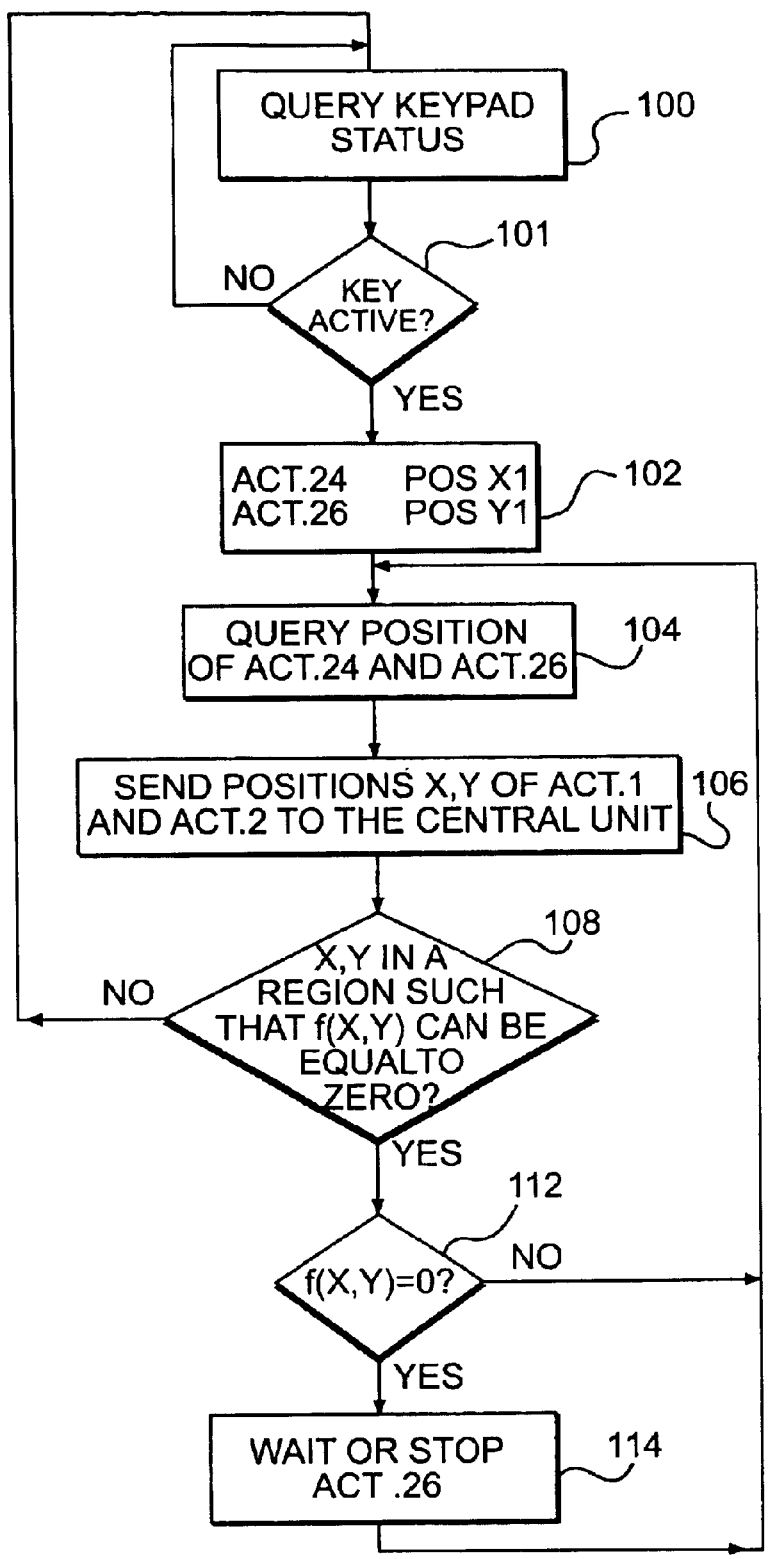
FIG. 3 is a flow diagram explaining one exemplary embodiment of the seat according to the invention when using an algorithm for controlling its dynamics.

One example of an algorithm implementing such two-way exchanges of data is given by way of example with reference to FIG. 3.

This algorithm deploys the leg-rest 20 and the foot-rest 22 from any initial position into a final position in which the leg-rest is roughly horizontal in the continuation of the seat cushion 16 and the foot-rest is extended out of the leg-rest without, however, its free end striking the seat in front.

The algorithm illustrated in FIG. 3 firstly of all has a loop waiting for a key on the keypad 38 to be pressed. In this loop, in step 100, a keyboard status query is sent by the central data processing unit 40 to the keypad 38. This query takes the form of a status request transmitted on the bus 42 by the transmission means 40C of the central unit and received by the receiving means 38B of the keypad.

When a key is depressed, the local control unit 38D of the keypad detects the depressing of the key associated with the desired movement.

When the status request is received, status data defining whether or not a key is depressed is sent, via the transmission means 38C, to the data processing unit 40 via the communication bus 42. This status data is received by the receiving means 40B and communicated to the analysis means 50 of the data processing unit.

The data processing unit 40 carries out a test 101 to determine whether or not a key has been depressed on the keypad 38. As long as a key has not been depressed, steps 100 and 101 are carried out in a loop.

In step 102, if the key corresponding to the deploying of the leg-rest and of the foot-rest has been depressed, the data processing unit 40 formulates two commands for the actuator 24 and the actuator 26 which act respectively on the leg-rest and on the foot-rest.

These commands take the form of a message sent by the transmission means 40C on the bus 42 to the actuators 24 and 26. This message gives the actuator 24 the order to move to a target position $X_l$ and gives the actuator 26 the order to move into a target position $Y_1$.

The commands sent by the central data processing unit 40 to each of the actuators are received by the receiving means 24B and 26B respectively and are processed by the local control unit 24D and 26D. The local control unit then operates the motor that constitutes the active element 24E, 26E of each actuator for movement towards the target position $X_l$ and $Y_1$, respectively.

As soon as the actuators 24 and 26 are operated, a loop monitoring the current position of each actuator is implemented by the central data processing unit 40. Initially, a position query of the actuators 24 and 26 is carried out in step 104. This position query taking the form of a status request is transmitted on the bus 42 by the data processing unit 40.

On receipt of this request, the local control unit 24D, 26D of each actuator 24, 26 sends, through the transmission means 24C, 26C, the current position values X and Y formed of the status data gathered by the position sensors 24F, 26F incorporated into each actuator, in step 106.

When the central data processing unit 40 receives the values X and Y of the current positions from the actuators 24 to 26 respectively, the analysis means 50 of the central data processing unit analyse the received values X and Y. In particular, it determines whether a predetermined function denoted $f(X, Y)$ is stored in memory, this function associating the relative movements of the actuators 24 and 26. This function is such that the equation $f(X, Y)=0$ constitutes, for the values X and Y of the positions of the two actuators, a condition defining a forbidden zone, thus forbidden zone having, for example, as its boundary, the limiting position that the free end of the foot-rest can occupy without striking the seat in front. This equation depends on the geometric configuration of the seat and on how it is arranged with respect to the seat in front.

If such a function is stored in the analysis means, then certain relative positions of the two actuators are forbidden, these positions corresponding to the zeroing of the function $f(X, Y)$.

One of the actuators is then said to be "confined" by the other actuator.

In step 108, a test is performed to determine whether the positions X and Y are such that $f(X, Y)$ can go to zero.

If $f(X, Y)$ cannot go to zero, then steps 100 to 108 are looped again, and so on until the actuators 24 and 26 respectively reach the position $X_l$ and $Y_1$. The stopping of each actuator is controlled by the local unit 24D, 26D of each actuator on the basis of the current positions read by the sensors 24F and 26F. These current positions are compared, within the local control units, with the target positions $X_l$ and $Y_1$ sent to the actuators.

If, on the other hand, in step 108, the analysis means 50 analyse that X and Y are in a zone such that $f(X, Y)$ can go to zero, then step 112 checks whether $f(X, Y)=0$. If it does, then that means that the foot-rest (actuator 26) is in a forbidden position given the position of the leg-rest (actuator 24).

As soon as this condition is satisfied in step 112, then in step 114 the central data processing unit stops actuator 26 or keeps it stopped if it has already stopped.

If the condition at step 112 is not satisfied or, on completion of step 114, steps 104 et seq are once again performed in a loop.

As soon as the condition of step 112 is no longer satisfied, the actuator 26 is made to operate again, so that it continues to move into its target position $Y_1$.

It will be appreciated that the communication network set up between the central data processing unit 40 and the various functional members of the seat provides for a two-way exchange of data, thus allowing the control of certain functional members to depend on operational status data from other functional members, thus guaranteeing synchronism of the operation of various functional members.

In addition, it will be appreciated that using a communication bus and an electrical distribution network supplying each functional members and the central data unit makes it possible to considerably reduce the number of wires used in the seat.

The use of a bus and of functional members into which a two-way communications interface are incorporated makes it possible easily to add or to remove functional members to or from the network. In particular, when using a serial bus, a functional member can be added very easily.

In addition, aside from synchronizing the control of various functional members, it is possible to monitor the operational condition of each functional member, thus allowing predictive maintenance, or alternatively ensuring satisfactory management of the power of the seat between the various functional members employed.

What is claimed is:

1. A vehicle seat comprising:
   at least one electrically powered functional member comprising:
   an active element adapted to perform a unique elemental function;
   a local control unit for controlling the active element of the at least one functional member from commands;
   receiving means for receiving commands, said receiving means being incorporated into the at least one functional member; and
   means for collecting operational status data from the at least one functional member; and
   a communication bus, to which the receiving means of the at least one functional member is directly connected, for transmitting commands,
   the at least one said functional member comprising operational status data transmission means and said data transmission means being connected to the communication bus for transmitting operational status data on the communication bus.

2. A vehicle seat according to claim 1, further comprising a central data processing unit which central data processing unit comprises, on the one hand, transmitting means for transmitting commands, said transmitting means being connected to the communication bus for transmitting at least one command to at least one functional member and, on the other hand, operational status data receiving means for receiving operational status data, said operational status data receiving means being connected to the communication bus for receiving operational status data transmitted by the at least one functional member.

3. A vehicle seat according to claim 2, wherein said central data processing unit comprises means for analyzing the operational status data received and means for formulating commands for the at least one functional member.

4. A vehicle seat according to claim 3, wherein said at least one functional member comprises at least two functional members and said analysis means are designed to analyze jointly operational status data from said at least two functional members.

5. A vehicle seat according to claim 1, wherein the at least one functional member is one of members selected from the group consisting of: an actuator, a heating member, a message device, an inflatable cushion, a lighting device, a keypad and an item of audiovisual equipment.

6. A vehicle seat according to claim 1, wherein the communication bus is a serial bus.

7. A vehicle seat according to claim 1, wherein the at least one functional member includes at least one non-active member having no active element adapted to exert an element function, the at least one non-active functional member comprising means for collecting operational status data from the non-active functional member.

8. A vehicle seat as claimed in claim 1 wherein said at least one functional member comprises a plurality of electrically powered functional members.

* * * * *